United States Patent [19]
Peterson et al.

[11] 3,879,280
[45] Apr. 22, 1975

[54] GEL SLAB ELECTROPHORESIS CELL AND ELECTROPHORESIS APPARATUS UTILIZING SAME

[75] Inventors: John I. Peterson, Falls Church, Va.; Andreas Chrambach, Bethesda, Md.; Julian W. Holland, Jr., Potomac, Md.; William R. Dehn, Spencerville, Md.; H. Douglas Swank, Boyds, Md.

[73] Assignee: The United States of America as represented by the Secretary, Department of Health, Education and Welfare.

[22] Filed: Apr. 16, 1974

[21] Appl. No.: 461,442

[52] U.S. Cl.............................. 204/299; 204/180 G
[51] Int. Cl............................................... B01k 5/00
[58] Field of Search............ 204/108 G, 180 R, 299

[56] References Cited
UNITED STATES PATENTS
3,129,158   4/1964   Raymond et al................ 204/180 G
3,374,166   3/1968   Raymond............................ 204/299
3,450,624   6/1969   Natelson............................. 204/299

*Primary Examiner*—John H. Mack
*Assistant Examiner*—A. C. Prescott

[57] ABSTRACT

An electrophoresis cell for use in the simultaneous electrophoresis of multiple samples in an elongated gel slab supporting medium in a multiphasic buffer system. The cell is provided with permanent sample partitions which define a plurality of individual sample-receiving compartments within the upper portion of the cell, enabling the cell to be used with mechanically labile stacking gels. The gel slab is prepared in situ within the cell, after which the samples are introduced into the partitioned compartments and electrophoresis carried out.

9 Claims, 3 Drawing Figures

GEL SLAB ELECTROPHORESIS CELL AND ELECTROPHORESIS APPARATUS UTILIZING SAME

This invention relates to a new, improved apparatus for electrophoretically separating the ionic components of a mixture, and more particularly, to a new, improved electrophoresis cell for use in the simultaneous electrophoresis of a plurality of samples in an elongated gel slab supporting medium in a multiphasic buffer system.

The process of separating the ionic components in a mixture by electrophoresis is based on the fact that ions of different substances, according to their electrical properties, migrate at different rates through a medium, such as starchblock, starch-gel or polyacrylamide gel which is subjected to an electric field. This difference in migration is utilized to provide separation, purification or analysis of such mixtures. For example, electrophoresis is used to analyze various substances including proteins such as albumin, enzymes, hemoglobin, carbohydrates, blood serum, and the like; various inorganic ions and like substances. Electrophoresis may also be used in food laboratories for detection of adulteration, identification of toxins, effectiveness of pasturization, and the like.

One type of apparatus presently commercially available for carrying out the electrophoresis consists of spaced upper and lower baths of electrolytic or buffer solutions with a plurality of small diameter glass or rigid plastic tubes extending therebetween. The upper and lower ends of these tubes are submerged in the upper and lower baths respectively, and each tube is filled with a gelatinous medium such as polyacrylamide gel. A sample of the mixture to be separated is introduced into the upper ends of the tubes, a voltage potential is imposed between the ends of the tubes and electrophoretic separation proceeds. Thereafter, the columns of gels are carefully removed from the tubes, stained and separately analyzed.

A modification of the above-described electrophoresis apparatus which has recently been proposed is the use of a unitary gel slab in place of the multiple gel tubes. The gel slab technique has several advantages when compared with the use of multiple gel tubes in gel electrophoresis at a constant gel concentration, at least in certain applications. Since the entire slab is polymerized at one time, there is generally obtained better uniformity and reproducibility of gel pore size, pH, ionic strength, temperature, and electrical field, than with separate tubes. Slabs provide convenience, since the number of pipettings is reduced. All samples are exposed to a gel of the same height. All of these advantages for the use of a slab apparatus are especially important when pore-gradient-electrophoresis is used since it has proved to be impossible to generate identical pore gradients in separate tubes, due to minute differences in flow rates through a manifold.

While having many advantages over the use of multiple gel tubes, the gel slab electrophoresis technique still entails certain definite disadvantages. For instance, one problem that has been encountered with gel slab electrophoresis has been the difficulty in maintaining separation between the different samples when attempting simultaneous electrophoresis of a plurality of samples. Individual sample pockets are generally formed in the gel slab by means of a slot forming member which projects into the gel-forming medium during the polymerization or setting of the medium and is removed after the gel has completely solidified or set up. However, in many electrophoresis applications, it is desirable to employ as the gel supporting medium an open pore "stacking gel" which is mechanically labile or fragile, and in these instances the sample pockets formed by the conventional sample slot-formers have been found to be too unstable to adequately maintain separation between the different samples.

It is therefore an object of the present invention to overcome some of the disadvantages of the prior art by providing a novel gel slab electrophoresis cell adapted for use in an apparatus for simultaneously electrophoretically separating the ionic components of a plurality of samples and which maintains adequate separation of the different samples even when the gel slab supporting medium is a mechanically labile stacking gel.

Another object of the invention is to provide a novel gel slab electrophoresis cell having permanent sample partitions which provide a plurality of individual mechanically stable sample-receiving compartments within the upper portion of the cell.

Still another object of the invention is to provide a gel slab electrophoresis cell having the characteristics described in the preceding objects and which may be readily disassembled after electrophoresis for quick and simple access to the treated gel.

Still a further object of the invention is to provide a gel slab electrophoresis cell having the characteristics described in the preceding objects, and which is simple in design, inexpensive to fabricate, and convenient to use.

The above objects are achieved in a preferred embodiment of this invention by the provision of a gel slab electrophoresis cell comprising a rear panel defining the rear wall of the cell, a pair of spacer means fixed to the opposite sides of the front face of the rear panel and extending along the entire length thereof thereby defining the side walls of the cell, an upper front panel fixed to the pair of spacer means and extending from the top of the cell partially along the length thereof, and a lower front panel removably secured to the pair of spacer means and extending from the bottom of the upper front panel to the bottom of the cell. The upper front panel and the lower front panel together define the front wall of the cell, and the rear, side and front walls of the cell define between them an open-ended elongated space for receiving a gel. The cell is provided with permanent sample partitions fixed to the rear panel and the upper front panel between the spacer means and which extend from the top of the cell to a point above the bottom of the upper front panel to thereby define a plurality of individual mechanically stable sample-receiving compartments within the upper portion of the cell. The gel slab electrophoresis cell of this invention may be used in a manner described hereinbelow in electrophoresis apparatus similar to the prior art apparatus described above, for simultaneously electrophoretically separating the ionic components of a plurality of samples while maintaining adequate separation of the different samples even when a mechanically labile stacking gel is used as the gel slab supporting medium.

The above and other objects of the invention will become better understood to those skilled in the art by reference to the following detailed description when viewed in light of the accompanying drawings wherein like components throughout the Figures thereof are indicated by like numerals and wherein.

Figure 1:
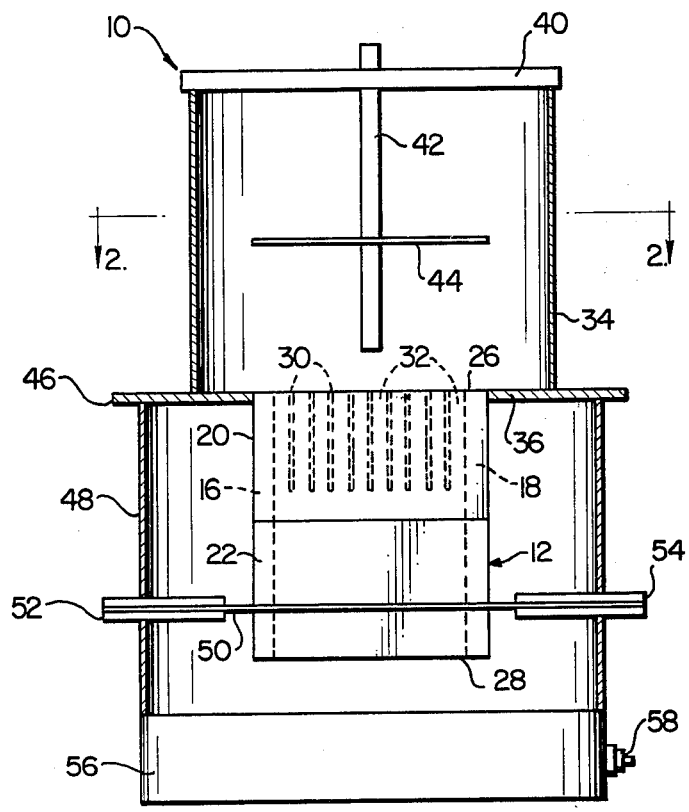
FIG. 1 is an elevation view of the electrophoresis apparatus employing the gel slab electrophoresis cell of the present invention.

Referring to the drawings, the electrophoresis apparatus 10 is constructed primarily of a clear, strong, chemically inert, electrical insulating material such as acrylic plastic or glass, glass being preferred due to its good heat transfer characteristics. This permits observation of the separation process during the operation of the apparatus and, of course, allows the operator to exercise a greater degree of control over the entire electrophoretic process.

Figure 3:
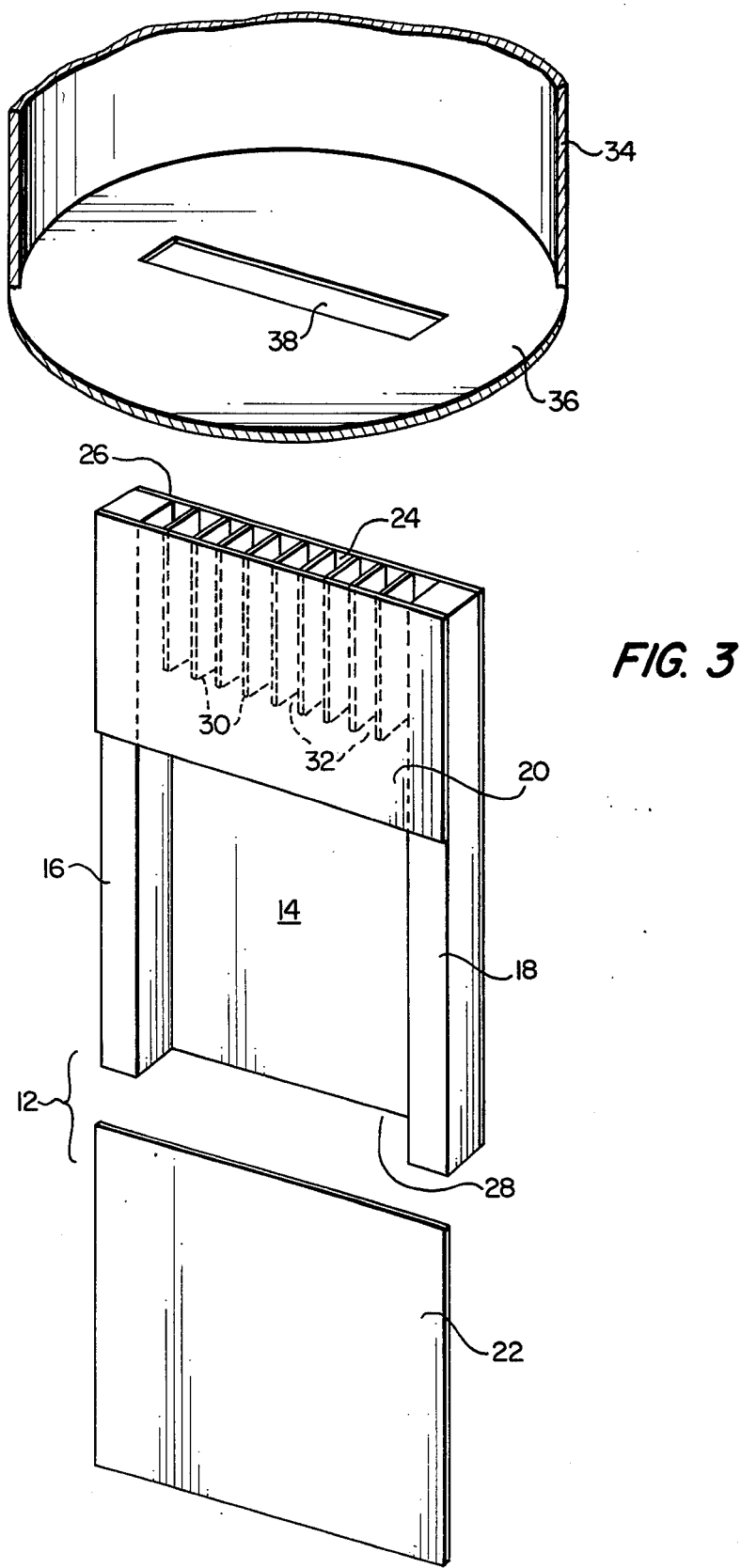
FIG. 3 is an enlarged exploded perspective view of the gel slab electrophoresis cell of the present invention and a portion of the electrophoresis apparatus of FIG. 1.

The apparatus 10 includes the gel slab electrophoresis cell 12 of the present invention, which, as best seen in FIG. 3, has an elongated rear panel 14 defining the rear wall of the cell. A pair of spacer members 16 and 18 are fixed to the opposite sides of the front face of the rear panel 14 and extend along the entire length thereof, thereby defining the side walls of the cell 12. An upper front panel 20 is fixed to the pair of spacer members 16 and 18 and extends from the top of the cell 12 partially along the length thereof. A lower front panel 22 is removably secured to the pair of spacer members 16 and 18 and extends from the bottom of the upper front panel 20 to the bottom of the cell 12. The upper front panel 20 and the lower front panel 22 together define the front wall of the cell 12. The cell 12 has an open upper end 26 and an open lower end 28, and the rear, side and front walls of the cell 12 thereby define between them an open-ended elongated spaced 24 for receiving a gel.

The cell 12 is provided with a plurality of partition members 30 which are fixed to the rear panel 14 and the upper front panel 20 between the spacer members 16 and 18 and which extend from the top of the cell 12 to a point above the bottom of the upper front panel 20 to thereby define a plurality of individual mechanically stable sample-receiving compartments 32 within the upper portion of the cell 12. In the preferred embodiment of the cell shown in the drawings, there are employed nine equally spaced partition members 30 which, together with the spacer members 16 and 18, divide the width of the cell into ten equally dimensioned sample-receiving compartments 32. It will be apparent, however, that the number and spacing of the partition members 30 and the resulting number and size of the sample-receiving compartments 32 may be varied as desired from that shown in the drawings without departing from the scope of this invention.

Figure 2:
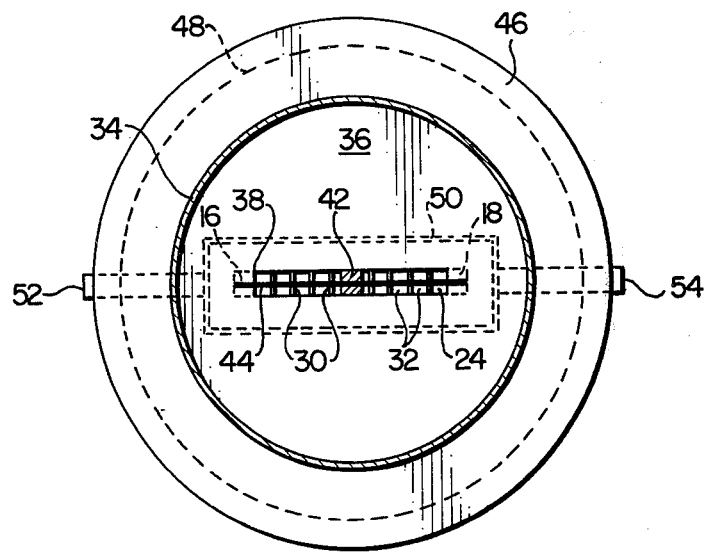
FIG. 2 is a horizontal sectional view taken on line 2—2 of FIG. 1.

The electrophoresis apparatus 10 also includes an upper buffer reservoir or container 34 having a bottom end 36 provided with an elongated opening 38. The electrophoresis cell 12 is fixed, for example, by adhesive bonding, to the bottom end 36 of the upper buffer reservoir 34, with the open upper end 26 of the cell 12 in sealing engagement with the opening 38 in the bottom end 36 of the upper buffer reservoir 34 so that the open upper end 26 of the cell 12 will be in contact with the buffer solution contained in the upper buffer reservoir 34. The upper buffer reservoir 34 is provided with a removable cover 40 which is provided with a downwardly extending electrode connecting rod 42 to which is attached a linear platinum wire electrode 44 which has a length equal to the width of the cell 12. With the apparatus assembled as in FIGS. 1 and 2, the length of the platinum wire electrode 44 is spaced from and centrally overlies the width of the open upper end 26 of the cell 12.

The bottom end 36 of the upper buffer reservoir 34 rests on the upper rim or ledge 46 of a lower buffer reservoir or container 48 with the cell 12 extending into the lower buffer reservoir 48 so that the buffer solution in the lower buffer reservoir 48 is in contact with the open lower end 28 of the cell 12. A rectangular platinum wire electrode 50, which is mounted in studs 52 and 54 projecting horizontally from the walls of the lower buffer reservoir 48, symmetrically surrounds the lower portion of the cell 12. The lower buffer reservoir 48 is provided at its base with a temperature control water jacket 56 provided with an outwardly projecting nipple 58 adapted to receive the ends of tubing or hoses (not shown).

Although the electrophoresis cell 12 of the present invention may be constructed of a plastic material such as acrylic plastic, it is preferably constructed of glass because the gel more reliably adheres to the glass surface under varying temperatures and gel compositions without leakage. Pyrex glass is preferably to other types of glass because of its better adherence to polyacrylamide gel, its strength, thermal resistance, and chemical purity, and the ease with which it can be cleaned with strong reagents. In fabricating the electrophoresis cell 12 of the present invention, the rear panel 14, spacer members 16 and 18, upper front panel 20 and partition members 30 may be fixedly joined to each other by any suitable means such as adhesive bonding or fusion bonding. Fusion bonding is generally preferred due to the relative weakness and lack of resistence to cleaning solutions of many adhesives and the undesirability of a fillet of adhesive along each joint which would break the gel-to-glass seal. One fabrication method found particularly suitable is to fusion bond all of the parts which are to be fixedly joined together in one step in a high temperature oven, with all components positioned precisely by a graphite jig. The lower front panel 22 may then be removably secured in place by means of a thin band of, for example, a sealing mixture of 1:3 paraffin-vaseline.

The operation of the apparatus is as follows:

The upper buffer reservoir 34 with the electrophoresis cell 12 fixed thereto and with the lower front panel 22 removably secured in place, is inverted, and the open lower end 28 of the cell 12 is sealed with Parafilm, which is held in place with two rubber bands. After testing that the Parafilm seal is water-tight, the upper buffer reservoir 34 is inserted in position on the lower buffer reservoir 48 filled with buffer solution, with the cell 12 extending into the lower buffer reservoir 48. Polyacrylamide gel-forming polymerization mixture is then pipetted into the cell 12 until the upper surface of the polymerization mixture extends just above the upper edge of the lower front panel 22. When the gel has set or solidified, the Parafilm seal is removed and the upper buffer reservoir 34 is filled with water or buffer solution to a height of a few centimeters and reinserted on the lower buffer reservoir 48. Polyacrylamide gel-forming polymerization mixture for the formation of stacking gel, in 25% sucrose, is then pipetted onto the surface of the lower gel layer in the cell 12 until the sample-receiving compartments 32 are half filled. After the upper gel layer has set or solidified, the upper buffer reservoir 34 is drained and then filled with buffer solution.

Samples to be analyzed are then introduced into each sample-receiving compartment 32 by means of a micropipet, directing the stream of sample against an upper corner of each compartment 32 in 10–40% sucrose or other dense medium. A voltage potential is then applied between the linear platinum wire electrode 44 and the rectangular platinum wire electrode 50, and electrophoresis is allowed to proceed at a constant current density of 6–10 ma/1.6 cm$^2$ at 0°C or 12–20 ma/1.6 cm$^2$ at 25°C. After electrophoresis, the removable lower front panel 22 is removed from the cell and the gel slab is rimmed with a needle and water jet. The gel slab is then severed by a spatula below the partition members 30, the upper buffer reservoir 34 is filled with water and the gel slab is again rimmed until the gel slab is freed. The gel slab is then collected in a Petri dish, photographed and stained in the normal manner. The apparatus may readily be cleaned with a pipette brush and concentrated detergent, or by acid-washing.

What is claimed is:

1. A gel slab electrophoresis cell adapted for use in an apparatus for simultaneously electrophoretically separating the ionic components of a plurality of samples, said cell comprising a rear panel defining the rear wall of said cell, a pair of spacer means fixed to the opposite sides of the front face of said rear panel and extending along the entire length thereof thereby defining the side walls of said cell, an upper front panel fixed to said pair of spacer means and extending from the top of said cell partially along the length thereof, a lower front panel removably secured to said pair of spacer means and extending from the bottom of said upper front panel to the bottom of said cell, said upper front panel and said lower front panel thereby together defining the front wall of said cell, said rear, side and front walls thereby defining between them an open-ended elongated space for receiving a gel, and partition means fixed to said rear panel and said upper front panel between said spacer means and extending from the top of said cell to a point above the bottom of said upper front panel to thereby define a plurality of individual sample-receiving compartments within the upper portion of said cell.

2. The gel slab electrophoresis cell of claim 1 wherein said partition means comprises a plurality of equally-spaced partition members defining a plurality of equallydimensioned sample-receiving compartments.

3. The gel slab electrophoresis cell of claim 2 wherein said rear panel, said pair of spacer means, said upper front panel, said lower front panel and said partition members are all formed of glass.

4. The gel slab electrophoresis cell of claim 3 wherein said rear panel, said pair of spacer means, said upper front panel and said partition members are fusion bonded together.

5. An apparatus for simultaneously electrophoretically separating the ionic components of a plurality of samples comprising a first container for holding buffer solution and having an elongated opening in its bottom end; a gel slab electrophoresis cell fixed to said bottom end of said first container and having an open upper end in sealing engagement with said opening in the bottom of said first container so as to be in contact with said buffer solution contained therein, said cell comprising a rear panel defining the rear wall of said cell, a pair of spacer means fixed to the opposite sides of the front face of said rear panel and extending along the entire length thereof thereby defining the side walls of said cell, an upper front panel fixed to said pair of spacer means and extending from the top of said cell partially along the length thereof, a lower front panel removably secured to said pair of spacer means and extending from the bottom of said upper front panel to the bottom of said cell, said upper front panel and said lower front panel thereby together defining the front wall of said cell, said rear, side and front walls thereby defining between them an open-ended elongated space for receiving a gel, and partition means fixed to said rear panel and said upper front panel between said spacer means and extending from the top of said cell to a point above the bottom of said upper front panel to thereby define a plurality of individual sample-receiving compartments within the upper portion of said cell; a second container for holding buffer solution disposed perimetrically about said cell so that the buffer solution is in contact with the open lower end of said cell; and electrode means for maintaining a potential difference between said upper and lower ends of said cell through the buffer solutions.

6. The apparatus of claim 5 wherein said partition means comprises a plurality of equally-spaced partition members defining a plurality of equally-dimensioned sample-receiving compartments.

7. The apparatus of claim 5 wherein said first container rests on top of said second container with said cell extending into said second container.

8. The apparatus of claim 5 wherein said second container is provided with a temperature-controlling jacket.

9. The apparatus of claim 5 wherein said electrode means includes a linear electrode in said first container spaced from and centrally overlying said upper end of said cell, and a rectangular electrode in said second container symmetrically surrounding the lower portion of said cell.

* * * * *